(12) United States Patent
Namm (10) Patent No.: US 8,989,167 B2
(45) Date of Patent: Mar. 24, 2015

(54) METHOD AND APPARATUS FOR ESTABLISHING RADIO COMMUNICATIONS ON A TRUNKED NETWORK USING AN INBOUND PROXY

(71) Applicant: Motorola Solutions, Inc., Schaumburg, IL (US)

(72) Inventor: Joseph C. Namm, Plantation, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 170 days.

(21) Appl. No.: 13/648,671

(22) Filed: Oct. 10, 2012

(65) Prior Publication Data

US 2014/0098717 A1     Apr. 10, 2014

(51) Int. Cl.
H04B 7/26     (2006.01)
H04W 72/04    (2009.01)

(52) U.S. Cl.
CPC ........... *H04B 7/2606* (2013.01); *H04W 72/042* (2013.01)
USPC ......................................................... 370/341

(58) Field of Classification Search
USPC ................. 370/315, 316, 327, 329, 340, 341; 455/7, 11.1
See application file for complete search history.

(56) References Cited

U.S. PATENT DOCUMENTS

| | | | |
|---|---|---|---|
| 5,179,720 A | 1/1993 | Grube et al. | |
| 6,141,533 A | 10/2000 | Wilson et al. | |
| 6,608,838 B2 | 8/2003 | Ozluturk | |
| 6,735,634 B1 * | 5/2004 | Geagan et al. | 709/235 |
| 7,349,355 B2 | 3/2008 | Sengupta et al. | |
| 7,392,053 B1 * | 6/2008 | Conner et al. | 455/445 |
| 7,689,223 B1 | 3/2010 | Lewis | |
| 7,953,210 B2 | 5/2011 | Elder et al. | |
| 2001/0047421 A1 * | 11/2001 | Sridhar et al. | 709/230 |
| 2002/0064126 A1 | 5/2002 | Bhattal et al. | |
| 2008/0062997 A1 * | 3/2008 | Nix | 370/395.2 |
| 2009/0221303 A1 | 9/2009 | Soliman | |
| 2009/0287968 A1 * | 11/2009 | Lee et al. | 714/699 |
| 2010/0322236 A1 | 12/2010 | Vimpari et al. | |
| 2012/0122511 A1 | 5/2012 | Antonio et al. | |

OTHER PUBLICATIONS

European Telecommunications Standard Institute (ETSI); ETS300396-1; Terrestrial Trunked Radio (TETRA) Technical Requirements for Direct Mode Operation (DMO); Part 1: General Network Design; March 1998; 34 pages.
European Telecommunications Standard Institute (ETSI); Terrestrial Trunked Radio (TETRA) Voice Plus Data (V+D) Designer's Guide 1 Part 3: Direct Mode Operation (DMO); Section 6; TR102-300-3 V1.3.3; Jun. 2009.
European Telecommunications Standard Institute (ETSI); EN300396-5'V1.3.1; Terrestrial Trunked Radio (TETRA) Technical Requirements for Direct Mode Operation (DMO); Part 5: Gateway Air Interface, Dec. 2011.

\* cited by examiner

*Primary Examiner* — Kerri Rose
(74) *Attorney, Agent, or Firm* — Daniel R. Bestor (57) ABSTRACT

A method and device enables establishing radio communications on a trunked network using an inbound proxy. The method includes receiving, at a first subscriber device, a control signal from a base station on an outbound control channel of the base station. A request is then transmitted from the first subscriber device to the base station on an inbound control channel of the base station. Next, it is determined, at the first subscriber device, that the request was not received by the base station. The request is therefore re-transmitted from the first subscriber device to a second subscriber device on an inbound proxy control channel. The first subscriber device then receives a response to the request from the base station. The first subscriber device is thus able to subsequently establish radio communications on the trunked network via the second subscriber device.

20 Claims, 5 Drawing Sheets

METHOD AND APPARATUS FOR ESTABLISHING RADIO COMMUNICATIONS ON A TRUNKED NETWORK USING AN INBOUND PROXY

FIELD OF THE DISCLOSURE

The present disclosure relates generally to wireless communication networks, and more particularly to establishing radio communications on a trunked network using a proxy.

BACKGROUND

The Telecommunications Industry Association (TIA) Project 25 (P25) concerns a set of standards for digital radio communications for use by various groups including emergency response teams. P25 was established to address the need for common digital public safety radio communications standards, including push-to-talk (PTT) two-way radio communications standards.

P25 systems involve trunked radio communication. In a trunked radio communication network, a pool of available radio voice channels is maintained by a base station, and one or more radio control channels are used to assign a radio voice channel to a particular group of two-way radios from the pool as and when required. The radio voice channel is then returned to the pool upon completion of communication between the particular group of two-way radios.

All radios in a trunked radio communication network sometimes are not able to communicate effectively with the base station. For example, factors such as distance, transmitting power, and physical or geographic barriers may cause the radio of a specific subscriber unit to be able to receive control communications from a base station, but the subscriber unit is unable to successfully transmit control or other communications back to the base station. Mechanisms, including various proxy schemes and repeater elements, have been devised to improve the ability of individual radios in a network to communicate with the base station. However, such mechanisms often require additional network hardware, such as complex repeater systems.

Accordingly, there is a need for an improved method and apparatus for establishing radio communications on a trunked network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments, a method is provided for establishing radio communications on a trunked network using an inbound proxy. The method includes receiving, at a first subscriber device, a control signal from a base station on an outbound control channel of the base station. A request is then transmitted from the first subscriber device to the base station on an inbound control channel of the base station. Next, it is determined, at the first subscriber device, that the request was not received by the base station. The request is thereafter re-transmitted from the first subscriber device to a second subscriber device on an inbound proxy control channel. The first subscriber device then receives a response to the request from the base station. The first subscriber device is thus able to subsequently establish radio communications on the trunked network via the second subscriber device acting as an inbound traffic proxy for the first subscriber device.

Figure 1:
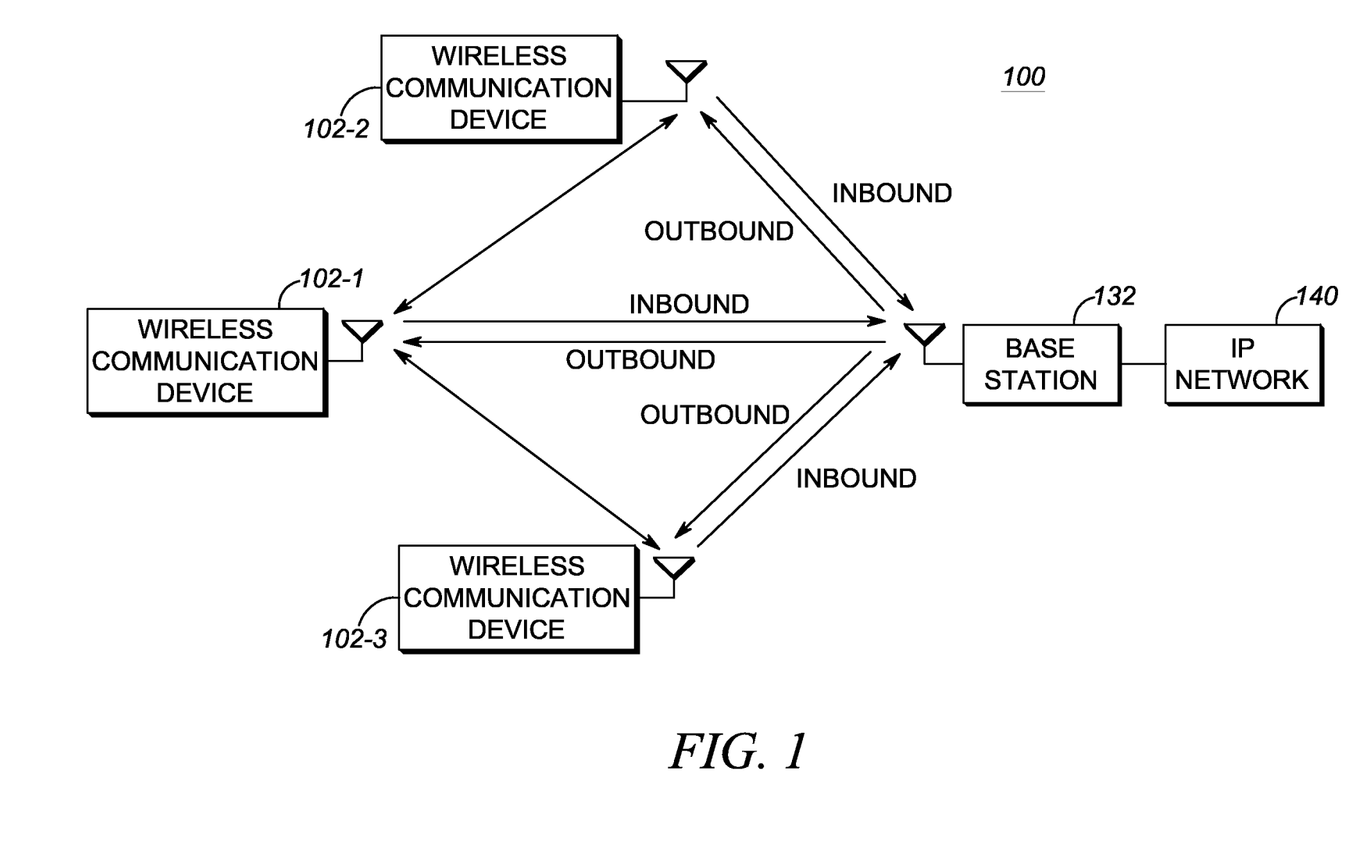
FIG. 1 is a block diagram of a trunked radio communications network, in accordance with some embodiments.

FIG. 1 is a block diagram of a trunked radio communications network 100, according to one embodiment. The network 100 may include one or more base stations 132 that are communicatively coupled to an Internet Protocol (IP) network 140 via a communication link, and a plurality of wireless communication devices (WCDs) 102-1, 102-2, 102-3. In one implementation, the communication link can be an Internet Protocol (IP) based communication link for transferring information between a plurality of the base stations 132 or between other network infrastructure.

The network 100 illustrated in FIG. 1 is a simplified representation of one particular network configuration, and many other network configurations are possible. For ease of illustration, only the three WCDs 102-1, 102-2, 102-3 and one base station 132 are shown. However, those skilled in the art will appreciate that a typical network can include any number of WCDs 102-n and any number of base stations 132 distributed in various configurations, where the base stations 132 may be communicatively coupled to one another via the IP network 140. It also will be appreciated by those of ordinary skill in the art that the base station 132 and the WCDs 102-1, 102-2, 102-3 can be, for example, part of a wide area network (WAN) that is distributed over a wide area that spans multiple access networks.

Examples of the network 100 are described in a number of standards that relate to digital two-way radio systems. Such standards include the Terrestrial Trunked Radio (TETRA) Standard of the European Telecommunications Standards Institute (ETSI), Project 25 of the Telecommunications Industry Association (TIA) and ETSI's digital wireless communication device (DMR) Tier-2 Standard, which are incorporated by reference herein in their entirety. The TETRA standard is a digital standard used to support multiple communication groups on multiple frequencies, including one-to-one, one-to-many and many-to-many calls. The TETRA standards and DMR standards were developed by the European Telecommunications Standards Institute (ETSI). The ETSI DMR Tier-2 standard is a digital radio standard that describes a two-way peer-to-peer communication system. Any of the TETRA standards or specifications or DMR standards or specifications referred to herein may be obtained by contacting ETSI at ETSI Secretariat, 650, route des Lucioles, 06921 Sophia-Antipolis Cedex, FRANCE. Project 25 defines similar capabilities, and is typically referred to as Project 25 Phase I and Phase II. Project 25 (P25) or APCO-25 refer to a suite of standards for digital radio communications for use by federal, state/province and local public safety agencies in North America to enable them to communicate with other agencies and mutual aid response teams in emergencies. The Project 25 (P25) specifies standards for the manufacturing of interoperable digital two-way wireless communications products. Developed in North America under state, local and federal representatives and Telecommunications Industry Association (TIA) governance, P25 is gaining worldwide acceptance for public safety, security, public service, and commercial applications. The published P25 standards suite is administered by the Telecommunications Industry Association (TIA Mobile and Personal Private Radio Standards Committee TR-8). Any of the P25 standards or specifications referred to herein may be obtained at TIA, 2500 Wilson Boulevard, Suite 300, Arlington, Va. 22201.

The illustrated WCDs 102-1, 102-2, 102-3 may each be, for example, a portable/mobile radio, a personal digital assistant, a cellular telephone, a video terminal, a portable/mobile computer with a wireless modem, or any other wireless communication device. Such devices are also referred to in the art as subscriber units (SUs), mobile stations, mobile equipment, handsets, mobile subscribers, or an equivalent.

The WCDs 102-1, 102-2, 102-3 communicate over wireless communication links, as represented by the arrows in FIG. 1, with the base station 132. The base station 132 also may be referred to as a base radio, repeater, access point, or an equivalent. The base station 132 generally includes, for example, a repeater and a router and can also include other elements to facilitate the communications between the WCDs 102-1, 102-2, 102-3 and the IP network 140.

As used herein, the term "inbound" refers to a communication originating from a wireless communication device that is destined for a base station or other network control device, whereas the term "outbound" refers to a communication originating from a base station or other network control device that is destined for a wireless communication device.

In some implementations, the WCDs 102-1, 102-2, 102-3 can communicate with each other through the base station 132. The base station 132 generally comprises one or more repeater devices that can receive a signal from a transmitting wireless communication device over one wireless link and re-transmit the signal to listening wireless communication devices over different wireless links. For example, WCD 102-2 can transmit a signal over an inbound wireless link to the base station 132 and the base station 132 can re-transmit the signal to listening wireless communication devices such as WCDs 102-1, 102-3 over other outbound wireless links. In addition, WCDs 102-1, 102-2, 102-3 may communicate with other wireless communication devices (not shown) that are located in other "zones," perhaps via IP network 140.

Moreover, although communication between wireless communication devices can be facilitated by the base station 132, in some implementations the WCDs 102-1, 102-2, 102-3 can communicate directly with each other when they are in communication range of each other using a direct mode of operation and without assistance from the base station 132. When communicating in a direct mode, the WCDs 102-1, 102-2, 102-3 may, for example, communicate directly with each other using communication time slots normally reserved for outbound communications.

Figure 2:
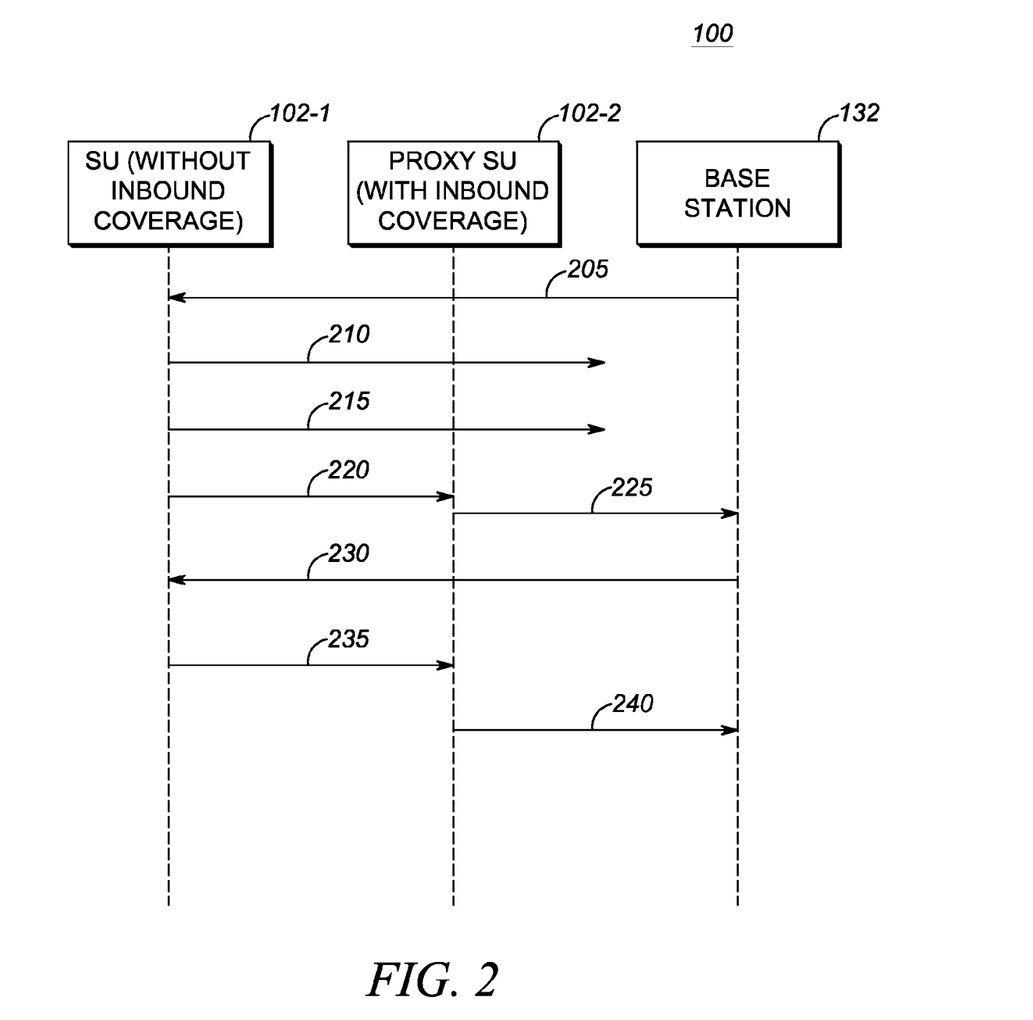
FIG. 2 is a message sequence chart illustrating a method of establishing radio communications on the trunked radio communications network using a proxy, in accordance with some embodiments.

FIG. 2 is a message sequence chart illustrating a method of establishing radio communications on the trunked radio communications network 100 using a proxy, according to an embodiment. First, at transmission 205, the base station 132 transmits a control signal on an outbound control channel to a first subscriber device such as the WCD 102-1. Those having ordinary skill in the art will appreciate that such a control signal can include any type of control data, such as network architecture data, channel configuration data, or network polling requests, among other possibilities.

Next, at transmission 210, the WCD 102-1 attempts to transmit to the base station 132 a request on an inbound control channel. For example, the request can be a request to obtain data, to establish a call, or various other network requests. However, as shown in FIG. 2, the transmission 210 is unable to be successfully received at the base station 132. For example, a transmitter of the WCD 102-1 may not have enough power and range to reach the base station 132, or the transmission 210 may be blocked by a physical obstruction such as a building or a geographical obstruction such as a hill.

At transmission 215, the WCD 102-1 may again attempt to contact the base station 132 directly by transmitting another request on an inbound control channel. However, the transmission 215 is also unable to be successfully received at the base station 132. The WCD 102-1 therefore determines, due to the one or more inbound failures, that it is unable to contact the base station 132 directly but that the base station 132 can contact the WCD 102-1 directly.

Therefore, at transmission 220, the WCD 102-1 re-transmits the request towards base station 132 on an inbound proxy control channel. The inbound proxy control channel can be, for example, assigned by the base station 132 and informed to the WCD 102-1 using an outbound signaling packet (OSP). Additionally or alternatively, WCD 102-1 may be pre-configured with the identity to the inbound proxy control channel. According to some embodiments, the WCD 102-1 may also continue to attempt to contact the base station 132 directly. Further, the WCD 102-1 can, according to some embodiments, add a pre-time to the request to enable a recipient to have more time to scan and decode the request.

Other subscriber devices in the network 100, such as the WCDs 102-2, 102-3, periodically scan and monitor the inbound proxy control channel and can determine that the WCD 102-1 requires the assistance of a proxy in communicating with the base station 132. For example, if the WCD 102-2 first determines that the WCD 102-1 requires the assistance of a proxy, at transmission 225 the WCD 102-2 relays one or more data packets included in the original transmission 220 to the base station 132 on an inbound control channel of the base station 132.

The base station 132 then recognizes that the WCD 102-1 has established radio communication on the network 100 via the WCD 102-2 acting as an inbound traffic proxy (for the uplink) and directly via the base station 132 (for the downlink). At transmission 230, the base station 132 thus transmits to the WCD 102-1 a response to the transmissions 220, 225 on an outbound control channel. All subscriber devices in the network 100 may then decode the response. The proxying WCD 102-2 will also decode and use any channel information in the response to proxy inbound voice or data transmissions for the out of inbound coverage WCD 102-1. For example, the transmission 230 may identify one or more of an inbound traffic channel of the base station to use for further communications from WCD 102-1, and an inbound proxy traffic channel, using a same or different channel than the inbound proxy control channel, for further communication from WCD 102-1.

Further communications from the WCD 102-1, such as the transmission 235 relayed as transmission 240, are then also relayed via the WCD 102-2 to the base station 132 using one of a designated inbound proxy traffic channel and the inbound proxy control channel. A designated inbound proxy traffic channel can be designated by the base station 132 in the transmission 230 (or in a subsequent transmission, not shown) and may be a same or different channel than the channel assigned for the inbound proxy control channel.

The transmissions 235, 240 can include, for example, voice data packets of a voice call or data packets representing text, images, or video. In one embodiment, further request/reply sequences of radio communications can be each first attempted using an inbound control channel of the base station 132 before they are attempted using an inbound proxy control channel.

Voice transmissions can take place substantially in real time if WCD 102-2 is full-duplex capable, or after buffering to overcome an inability to perform full duplex communications at a half-duplex inbound proxying subscriber device such as the WCD 102-2.

Figure 3:
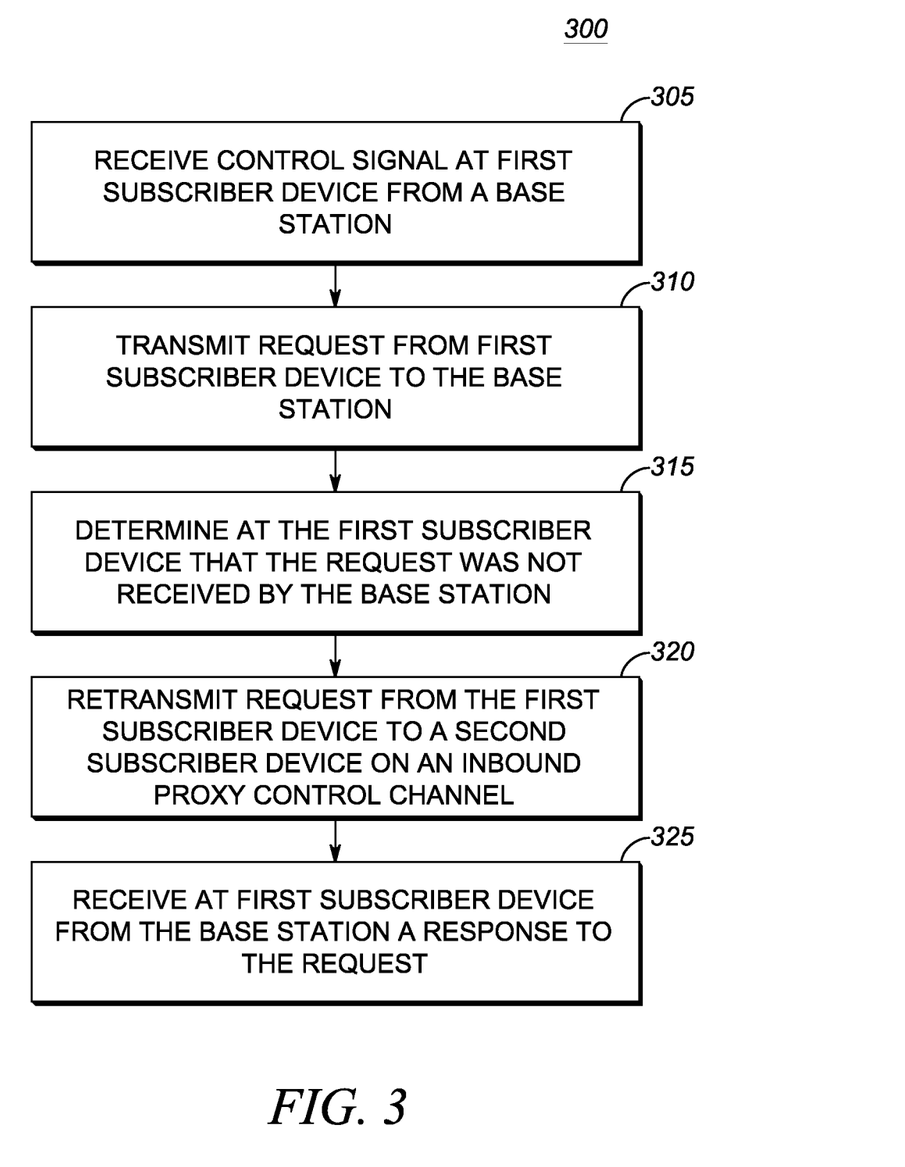
FIG. 3 is a general flow diagram illustrating a method for establishing radio communications on a trunked network using a proxy, in accordance with some embodiments.

FIG. 3 is a general flow diagram illustrating a method 300 for establishing radio communications on a trunked network using a proxy, according to one embodiment. The method 300 is illustrated from the perspective of a wireless communication device, such as the device WCD 102-2, which lacks direct inbound communication to a base station but which is within direct outbound coverage of the base station. At block 305 a first subscriber device receives a control signal from a base station on an outbound control channel. For example, at transmission 205 the base station 132 transmits a control signal on an outbound control channel to a first subscriber device such as the WCD 102-1.

At block 310, a request is transmitted from the first subscriber device to the base station on an inbound control channel of the base station. For example, at transmission 210, the WCD 102-1 attempts to transmit to the base station 132 a request on an inbound control channel of base station 132.

At block 315, it is determined at the first subscriber device that the request was not received by the base station. For example, the WCD 102-1 determines that it is unable to contact the base station 132 directly because no response is received to either transmission 210 or transmission 215.

At block 320, the request from the first subscriber device is retransmitted to a second subscriber device on a proxy control channel. For example at transmission 220 the WCD 102-1 re-transmits to the WCD 102-2 the request on an inbound proxy control channel.

At block 325 the first subscriber device receives a response to the request from the base station, whereby the first subscriber device subsequently establishes radio communications on the trunked network via the second subscriber device acting as a traffic proxy for the first subscriber device. For example, voice data packets in the transmissions 235, 240 are relayed via the WCD 102-2 to the base station 132 using a designated proxy channel.

Figure 4:
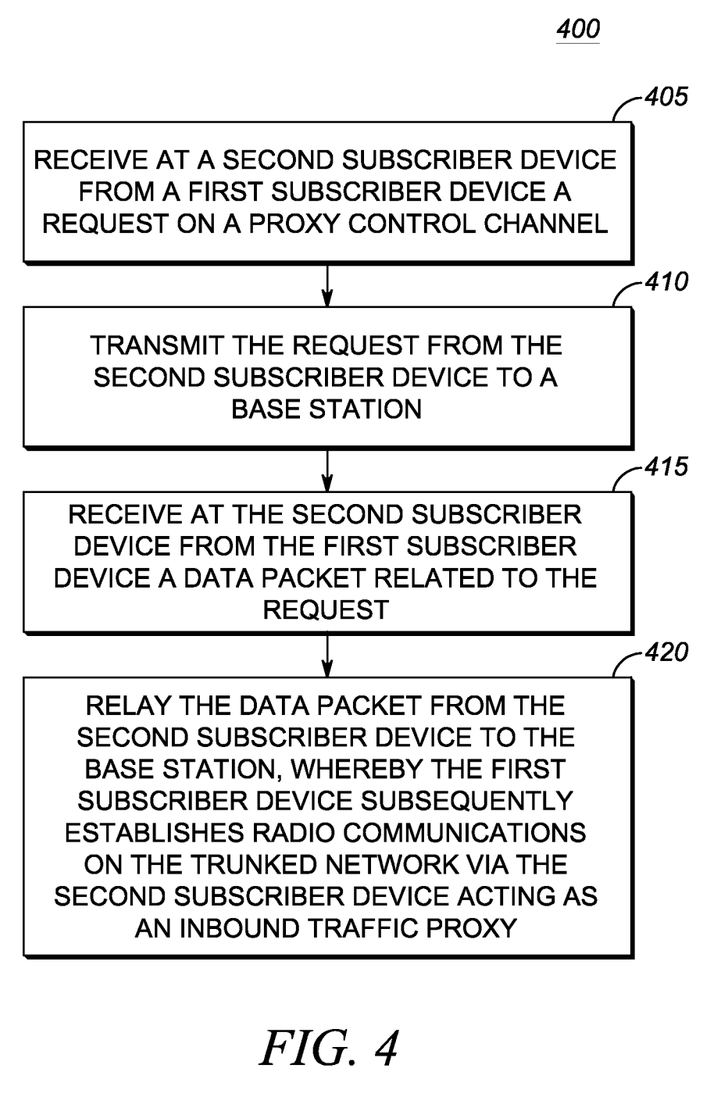
FIG. 4 is a general flow diagram illustrating another method for establishing radio communications on a trunked network using a proxy, in accordance with some embodiments.

FIG. 4 is a general flow diagram illustrating a method 400 for establishing radio communications on a trunked network using a proxy, according to another embodiment. The method 400 is from the perspective of a wireless communication device, such as the device WCD 102-2, which maintains inbound communication to a base station and acts as a proxy for another device such as the WCD 102-1. At block 405, a second subscriber device receives from a first subscriber device, a request on a proxy control channel. For example, at transmission 220 the WCD 102-2 receives a re-transmitted request from the WCD 102-1 on an inbound proxy control channel.

At block 410, the second subscriber device transmits the request to a base station on an inbound control channel of the base station. For example, at transmission 225 the WCD 102-2 relays one or more data packets included in the original transmission 220 to the base station 132 on an inbound control channel of the base station 132.

At block 415 the second subscriber device receives from the first subscriber device, a data packet related to the request on one of the inbound proxy control channel or an inbound proxy traffic channel (assigned to a same or different channel as the inbound proxy control channel). Next, at block 420, the second subscriber device relays the data packet to the base station on an inbound traffic channel of the base station, whereby the first subscriber device subsequently establishes radio communications on the trunked network via the second subscriber device acting as an inbound traffic proxy for the first subscriber device. For example, the transmission 235 is relayed via the WCD 102-2 as transmission 240 to the base station 132 using one of the designated inbound proxy traffic channel or the inbound proxy control channel and an inbound traffic channel of the base station 132.

Figure 5:
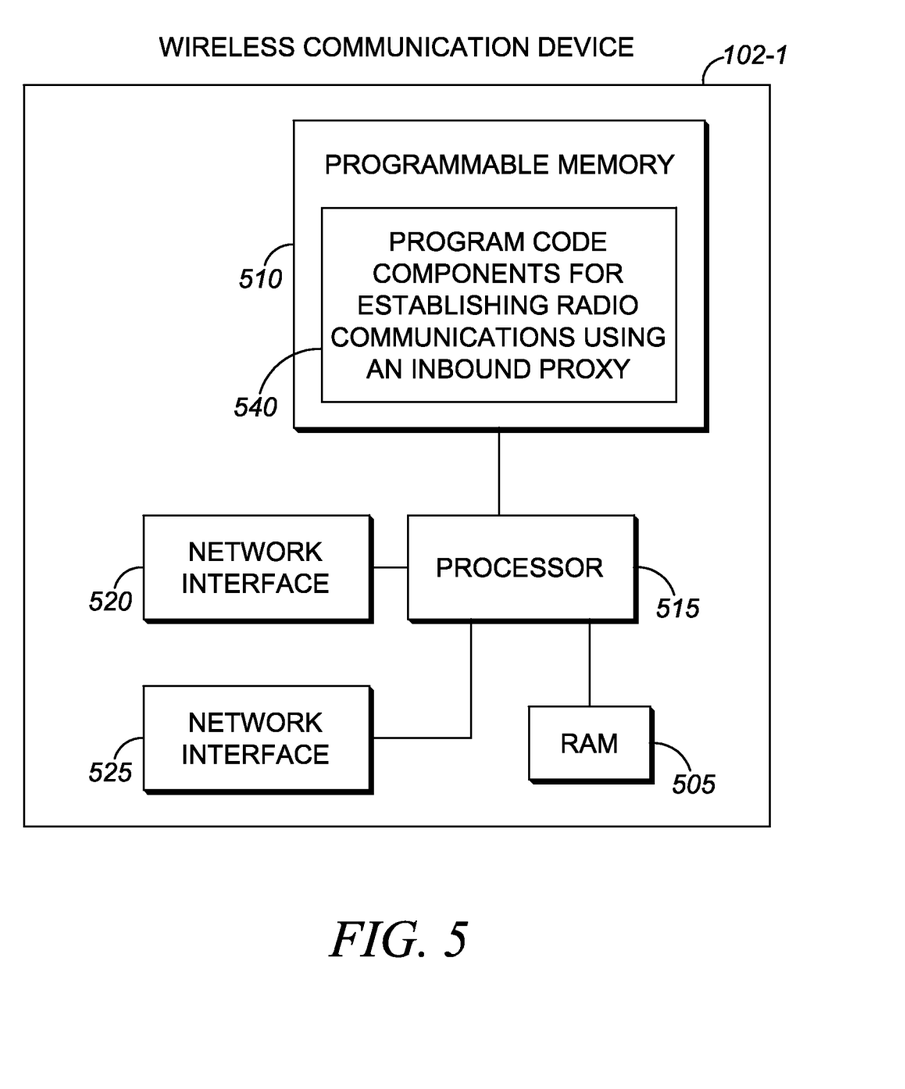
FIG. 5 is a block diagram that illustrates components of a wireless communication device, in accordance with some embodiments.

Referring to FIG. 5, a block diagram illustrates components of a wireless communication device, such as the WCD 102-1 or the WCD 102-2, according to an embodiment. The WCD 102-1, for example, can comprise at least all the elements depicted in FIG. 5, as well as any additional elements necessary for the WCD 102-1 to perform additional desired functions. Alternatively, the WCD 102-1 can comprise a collection of appropriately interconnected units or devices, wherein such units or devices perform, together, functions that are equivalent to the functions performed by the elements depicted in FIG. 5.

The WCD 102-1 comprises a random access memory (RAM) 505 and a programmable memory 510 that are coupled to a processor 515. The processor 515 also has ports for coupling to network interfaces 520, 525. The network interfaces 520, 525 can be used to enable the WCD 102-1 to communicate with other devices in the wireless communication network 100.

The programmable memory 510 can store operating code (OC) for the processor 515 and code for performing functions associated with a communication device. For example, the programmable memory 510 can store computer readable program code components 540 configured to cause execution of a method, such as the method 300, for establishing radio communications on a trunked network using a proxy, as described herein.

Wireless portable electronic devices, such as the WCD 102-1, that utilize and benefit from embodiments of the present invention can utilize various types of wireless network architectures including a mesh enabled architecture (MEA) network, an Institute of Electrical and Electronics Engineers (IEEE) 802.11 network (e.g., 802.11a, 802.11b, 802.11g, 802.11n), a worldwide interoperability for microwave access (WiMax) network, a Terrestrial Trunked Radio (TETRA) network, a Project 25 network, or a digital wireless communication device (DMR) Tier-2 network. It will be appreciated by those of ordinary skill in the art that such wireless communication networks can alternatively comprise any packetized communication network where packets are forwarded across multiple wireless hops. For example, such a wireless communication network can be a network utilizing multiple access schemes such as OFDMA (orthogonal frequency division multiple access), TDMA (time division multiple access), FDMA (Frequency Division Multiple Access), or CSMA (Carrier Sense Multiple Access).

Advantages of some embodiments thus include enabling automatic increased coverage in a wireless communication network to a subscriber device, such as the WCD 102-1, on an as needed basis. Other subscriber devices in a network can thus automatically extend coverage when inbound coverage is lost at a particular subscriber device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for establishing radio communications on a trunked network using an inbound proxy, the method comprising:
   wirelessly receiving, at a first subscriber device, a signal directly from a base station on a downlink control channel of the base station;
   wirelessly transmitting a request from the first subscriber device directly to the base station on an uplink control channel of the base station;
   determining, at the first subscriber device, that the wirelessly transmitted request was not received by the base station, and responsively:
      wirelessly re-transmitting the request for receipt by the base station from the first subscriber device to a second subscriber device on an inbound proxy control channel; and
      wirelessly receiving, at the first subscriber device, a response to the request directly from the base station via the downlink control channel, whereby the first subscriber device subsequently establishes direct downlink radio communications and indirect uplink radio communications with the base station on the trunked network via the second subscriber device acting as an inbound proxy for first subscriber device to base station uplink radio communications.

2. The method of claim 1, further comprising transmitting, for receipt by the base station, a data packet from the first subscriber device to the second subscriber device on one of the inbound proxy control channel and an assigned inbound proxy traffic channel.

3. The method of claim 2, wherein the data packet is a voice data packet of a call.

4. The method of claim 2, wherein one or both of the inbound proxy control channel and the inbound proxy traffic channel is assigned by the base station using one or more outbound signalling packets (OSPs) over the downlink control channel.

5. The method of claim 2, further comprising relaying the data packet from the second subscriber device to the base station on a data channel specified in the response.

6. The method of claim 5, wherein the second subscriber device is a half-duplex radio communications device and buffers a plurality of data packets received on the one of the inbound proxy control channel and inbound proxy traffic channel from the first subscriber device before relaying the plurality of data packets on a traffic channel of the base station.

7. The method of claim 1, wherein the second subscriber device periodically scans the inbound proxy control channel to determine whether the first subscriber has transmitted the request.

8. The method of claim 1, wherein re-transmitting the request from the first subscriber device to the second subscriber device on the inbound proxy control channel comprises adding a pre-time to the request.

9. The method of claim 1, wherein further radio communications from the first subscriber are each first attempted using the uplink control channel of the base station before they are attempted using the inbound proxy control channel.

10. A subscriber device for establishing radio communications on a trunked network using an inbound proxy, the subscriber device comprising:
    a wireless network interface;
    a processor; and
    a memory coupled to the processor, the memory including computer readable program code components that, when executed by the processor, perform a set of functions including:
        receiving, via the wireless network interface, a signal directly from a base station on a downlink control channel of the base station;
        transmitting, via the wireless network interface, a request directly to the base station on an uplink control channel of the base station;
        determining that the wirelessly transmitted request was not received by the base station, and responsively:
            re-transmitting, via the wireless network interface, the request for receipt by the base station to a second subscriber device on an inbound proxy control channel; and
            receiving, via the wireless network interface, a response to the request directly from the base station via the downlink control channel, whereby the subscriber device subsequently establishes direct downlink radio communications and indirect uplink radio communications with the base station on the trunked network via the second subscriber device acting as an inbound proxy for subscriber device to base station uplink radio communications.

11. The subscriber device of claim 10, wherein the set of functions performed by the processor further comprises transmitting, via the wireless network interface for receipt by the base station, a data packet from the subscriber device to the second subscriber device on one of the inbound proxy control channel and an assigned inbound proxy traffic channel.

12. The subscriber device of claim 11, wherein the data packet is relayed from the second subscriber device to the base station on a data channel specified in the response.

13. The subscriber device of claim 10, wherein the second subscriber device is a half-duplex radio communications device and buffers a plurality of data packets received on the one of the inbound proxy control channel and inbound proxy traffic channel from the subscriber device before relaying the plurality of data packets on a traffic channel of the base station.

14. The subscriber device of claim 10, wherein one or both of the inbound proxy control channel and the inbound proxy traffic channel is assigned by the base station using one or more outbound signalling packets (OSPs) over the downlink control channel.

15. A method for establishing radio communications on a trunked network using an inbound-only proxy, the method comprising:
    wirelessly receiving, at a second subscriber device from a first subscriber device, a request for receipt by a base station on an inbound proxy control channel;
    wirelessly transmitting, by the second subscriber device, the request to the base station;
    wirelessly receiving, at the second subscriber device from the first subscriber device, a data packet related to the request; and
    wirelessly relaying, from the second subscriber device, the data packet to the base station, whereby the second subscriber device facilitates the first subscriber device subsequently establishing direct downlink radio communications and indirect uplink radio communications with the base station on the trunked network via the second subscriber device acting as an inbound-only wireless proxy for first subscriber device to base station uplink radio communications.

16. The method of claim 15, further comprising receiving a data packet sent from the first subscriber device at the second subscriber device on the inbound proxy control channel or on an inbound proxy traffic channel.

17. The method of claim 15, wherein the data packet is relayed from the second subscriber device to the base station on a data channel specified in a response to the request received by the second subscriber device via the downlink control channel.

18. The method of claim 15, wherein the second subscriber device buffers a plurality of data packets received from the first subscriber device before relaying the plurality of data packets to the base station.

19. The method of claim 15, wherein the inbound proxy control channel is assigned by the base station using an outbound signalling packet (OSP) over the downlink control channel.

20. The method of claim 15, wherein the data packet is a voice data packet of a call.

* * * * *